US009552731B2

(12) United States Patent
Sakata (10) Patent No.: US 9,552,731 B2
(45) Date of Patent: Jan. 24, 2017

(54) MOBILE COMMUNICATION APPARATUS, MOBILE COMMUNICATION METHOD AND PROGRAM (71) Applicant: NEC Corporation, Minato-ku, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/763,692

(22) PCT Filed: Jan. 30, 2014

(86) PCT No.: PCT/JP2014/052055
§ 371 (c)(1),
(2) Date: Jul. 27, 2015

(87) PCT Pub. No.: WO2014/119650
PCT Pub. Date: Aug. 7, 2014

(65) Prior Publication Data
US 2015/0356870 A1 Dec. 10, 2015

(30) Foreign Application Priority Data
Jan. 31, 2013 (JP) ................................ 2013-017373

(51) Int. Cl.
*G08G 1/00* (2006.01)
*G08G 1/16* (2006.01)
(Continued)

(52) U.S. Cl.
CPC ........ *G08G 1/161* (2013.01); *G08G 1/096716* (2013.01); *G08G 1/096741* (2013.01);
(Continued)

(58) Field of Classification Search
CPC combination set(s) only.
See application file for complete search history.

(56) References Cited
U.S. PATENT DOCUMENTS

2002/0008637 A1* 1/2002 Lemelson ................ G08G 1/07
340/907
2011/0015853 A1* 1/2011 Dekock ................ G08G 1/0104
701/532
(Continued)

FOREIGN PATENT DOCUMENTS

JP 2008-527824 A 7/2008
JP 2009-217593 A 9/2009
(Continued)

OTHER PUBLICATIONS

International Search Report for PCT Application No. PCT/JP2014/052055, mailed on Apr. 8, 2014.
(Continued)

*Primary Examiner* — Yonel Beaulieu (57) ABSTRACT

A mobile communication apparatus includes an abnormality detecting unit that detects whether or not there is an abnormality on a route; and a communication unit. When second abnormality detection information which differs from first abnormality detection information that indicates the detected abnormality has been received, it is determined that whether or not the abnormalities indicated by both information items coincide with each other. If it is determined that both abnormalities coincide with each other, then whether or not it is necessary to transmit the first abnormality detection information is determined based on a positional relationship between a position of the own apparatus and an occurrence point of the abnormality at the time when the abnormality indicated by the second abnormality detection information was detected.

7 Claims, 4 Drawing Sheets (51) Int. Cl.
*B60W 30/08* (2012.01)
*H04L 29/08* (2006.01)
*H04W 4/04* (2009.01)
*G08G 1/0967* (2006.01)

(52) U.S. Cl.
CPC ....... *G08G 1/096791* (2013.01); *G08G 1/166* (2013.01); *H04L 67/12* (2013.01); *H04W 4/046* (2013.01)

(56) References Cited

U.S. PATENT DOCUMENTS

| | | | | |
|---|---|---|---|---|
| 2011/0112747 | A1* | 5/2011 | Downs | G08G 1/0104 701/118 |
| 2011/0173015 | A1* | 7/2011 | Chapman | G01C 21/3691 705/1.1 |
| 2012/0323476 | A1 | 12/2012 | Funabashi | |

FOREIGN PATENT DOCUMENTS

| | | |
|---|---|---|
| JP | 2010-033346 A | 2/2010 |
| JP | 2012-038079 A | 2/2012 |
| JP | 2013-005186 A | 1/2013 |
| KR | 20090062275 A | 6/2009 |
| WO | 2005/074167 A2 | 8/2005 |
| WO | 2006/072850 A1 | 7/2006 |
| WO | 2010/045966 A1 | 4/2010 |

OTHER PUBLICATIONS

Japanese Notice of Allowance for JP Application No. 2014-559734 mailed on May 10, 2016 with English Translation.
Extended European Search Report for EP Application No. EP14746060.4 dated on Jul. 14, 2016.

* cited by examiner

MOBILE COMMUNICATION APPARATUS, MOBILE COMMUNICATION METHOD AND PROGRAM

CROSS-REFERENCE TO RELATED APPLICATIONS

This application is a National Stage Entry of PCT/JP2014/052055 filed on Jan. 30, 2014, which claims priority from Japanese Patent Application 2013-017373 filed on Jan. 31, 2013, the contents of all of which are incorporated herein by reference, in their entirety.

BACKGROUND

1. Technical Field

The present invention relates to a mobile communication apparatus, a mobile communication method, and a program.

2. Description of Related Art

In a known system, an own vehicle communicates with a neighboring vehicle to perform message transmission and reception (see, for example, Patent Document 1).

Patent Document 1: Japanese Translation of PCT International Application Publication No. 2008-527824

BRIEF SUMMARY

Problem to be Solved by the Invention

Repeatedly communicating the same information with a near vehicle may increase the communication traffic for inter-vehicle communications, thus raising a problem of suppressing available communication bands.

In light of the above circumstances, an object of the present invention is to provide a mobile communication apparatus, a mobile communication method, and a program, which can solve the above problem.

Means for Solving the Problem

In order to solve the above problem, the present invention provides a mobile communication apparatus comprising:

an abnormality detecting unit that detects whether or not there is an abnormality on a route; and a communication unit that includes a determination unit, wherein if the determination unit determines that transmission is necessary, the communication unit transmits first abnormality detection information which indicates the abnormality detected by the abnormality detecting unit, wherein when the determination unit has received second abnormality detection information which differs from the first abnormality detection information, the determination unit determines whether or not an abnormality indicated by the second abnormality detection information coincides with the abnormality detected by the abnormality detecting unit; and if it is determined that the abnormality indicated by the second abnormality detection information coincides with the abnormality detected by the abnormality detecting unit, the determination unit determines whether or not it is necessary to transmit the first abnormality detection information in accordance with a positional relationship between a position of the own apparatus and an occurrence point of the abnormality at the time when the abnormality indicated by the second abnormality detection information was detected.

The present invention also provides a mobile communication method comprising:

a step, executed by an abnormality detecting unit, that detects whether or not there is an abnormality on a route;

a step executed when a second abnormality detection information, which differs from a first abnormality detection information that indicates the abnormality detected by the abnormality detecting unit, has been detected, wherein the step determines whether or not an abnormality indicated by the second abnormality detection information coincides with the abnormality detected by the abnormality detecting unit;

a step executed if it is determined that the abnormality indicated by the second abnormality detection information coincides with the abnormality detected by the abnormality detecting unit, wherein the step determines whether or not it is necessary to transmit the first abnormality detection information in accordance with a positional relationship between the own position and an occurrence point of the abnormality at the time when the abnormality indicated by the second abnormality detection information was detected; and a step executed if it is determined in the necessity determination that it is necessary to transmit the first abnormality detection information, wherein the step transmits the first abnormality detection information that indicates the abnormality detected by the abnormality detecting unit.

The present invention also provides a program that makes a computer execute:

a step, executed by an abnormality detecting device, that detects whether or not there is an abnormality on a route;

a step executed when a second abnormality detection information, which differs from a first abnormality detection information that indicates the abnormality detected by the abnormality detecting device, has been detected, wherein the step determines whether or not an abnormality indicated by the second abnormality detection information coincides with the abnormality detected by the abnormality detecting device;

a step executed if it is determined that the abnormality indicated by the second abnormality detection information coincides with the abnormality detected by the abnormality detecting device, wherein the step determines whether or not it is necessary to transmit the first abnormality detection information in accordance with a positional relationship between the own position and an occurrence point of the abnormality at the time when the abnormality indicated by the second abnormality detection information was detected; and a step executed if it is determined in the necessity determination that it is necessary to transmit the first abnormality detection information, wherein the step transmits the first abnormality detection information that indicates the abnormality detected by the abnormality detecting device.

Effect of the Invention

In accordance with the present invention, the number of times of transmission of identical information can be reduced, and thereby it is possible to prevent the available communication band from being tightened due to unnecessary communication.

DETAILED DESCRIPTION

Below, an embodiment of the present invention will be explained with reference to the drawings.

Figure 1:
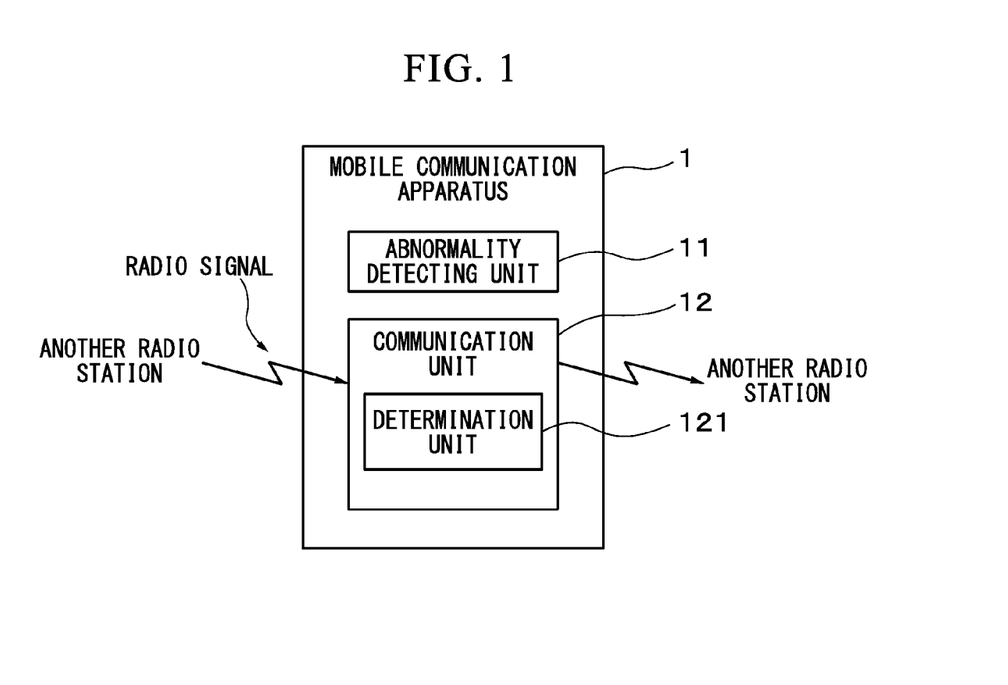
FIG. 1 is a block diagram showing an example of the configuration of an embodiment of the present invention.

FIG. 1 is a block diagram showing an example of the configuration of a mobile communication apparatus 1 according to an embodiment of the present invention.

The mobile communication apparatus 1 shown in FIG. 1 includes an abnormality detecting unit 11 and a communication unit 12.

In this embodiment, the mobile communication apparatus 1 is mounted on a vehicle. The mobile communication apparatus 1 may be built in a vehicle-mounted device.

The abnormality detecting unit 11 may be formed by employing a camera utilized to image an area in the advancing direction of a vehicle or the like, and a device which processes the image. The abnormality detecting unit 11 determines the presence or absence of an abnormality on a target route.

Here, an "abnormality" means a situation that causes trouble in transportation on a route, where the trouble may be an obstacle or a falling object on the road, an abnormality of the road (e.g., collapse of a slope or depression), or unusual weather (e.g., very heavy rain).

In addition, the abnormality detecting unit 11 is not limited to the camera and may be a device that detects an abnormality by using an optical sensor, an ultrasonic sensor, or the like. Alternatively, the abnormality detecting unit 11 may be a device that detects an abnormality based on a detection signal for a locked state or a skid state of a tire, where the signal may be received from an anti-lock (or anti-skid) braking system. The abnormality detecting unit 11 may also be a device that detects an abnormality based on a signal output from a manual switch which is operated when the user finds an abnormality.

Furthermore, the abnormality may be detected by appropriately combining the above-described structures.

When the abnormality detecting unit 11 is formed by employing a camera, the device that processes each obtained image may be provided outside the abnormality detecting unit 11 (but inside the mobile communication apparatus 1).

The communication unit 12 includes a transmitting and receiving unit for a radio signal, and a control unit that includes a CPU (central processing unit) which controls the transmitting and receiving unit and the like.

The communication unit 12 is provided to communicate a specific radio signal with other radio stations in a predetermined inter-vehicle or vehicle-road communication system.

Here, "other radio stations" may be another mobile communication apparatus 1 or an on-road communication apparatus that has a communication unit utilized to communicate with the above-described communication unit 12.

The communication unit 12 transmits abnormality detection information, which indicates an abnormality detected by the abnormality detecting unit 11 of the own apparatus 1 to which the communication unit 12 belongs, to another radio station. In the present embodiment, the communication unit 12 transmits the abnormality detection information (which indicates an abnormality detected by the abnormality detecting unit 11 of the own apparatus) to a following vehicle by means of radio multi-hop communication.

Therefore, the communication unit 12 as a communication device of a transmission source (i.e., as a parent communication unit) can transmit the abnormality detection information, which indicates an abnormality detected by the abnormality detecting unit 11 of the own apparatus.

The communication unit 12 also receives abnormality detection information detected by the abnormality detecting unit 11 of another mobile communication apparatus 1, from this mobile communication apparatus 1 directly or via another radio station. In the present embodiment, the communication unit 12 receives the abnormality detection information, which indicates an abnormality detected by the abnormality detecting unit 11 of the mobile communication apparatus 1 in a preceding vehicle, by means of radio multi-hop communication, and the communication unit 12 transfers the relevant information to a following vehicle behind.

Therefore, the communication unit 12 as a relay communication device (i.e., as a child communication unit) can receive the abnormality detection information, which indicates an abnormality detected by the abnormality detecting unit 11 of the mobile communication apparatus 1 in a preceding vehicle, and transfer the received information.

When the mobile communication apparatus 1 transfers the abnormality detection information to a following vehicle, the information cannot be transferred to any mobile communication apparatus 1 outside a range in which radio multi-hop communication can be performed.

Here, the abnormality detection information includes information that indicates the presence or absence of abnormality, the type and content of the abnormality, and the position (or an abnormality occurrence point) at which the abnormality was detected (this position information is represented utilizing longitude and latitude. The communication unit 12 can associate information, which indicates the number of times of transmission of the abnormality detection information and the time when the abnormality was detected, with the relevant abnormality detection information so that the associated information items are transmitted together.

When an abnormality detected by the mobile communication apparatus 1 built in a preceding vehicle is also detected by the mobile communication apparatus 1 of a following vehicle, the communication unit 12 (as the parent communication device of the radio multi-hop communication) of the mobile communication apparatus 1 in this following vehicle transmits abnormality detection information which indicates the abnormality identical to the previously-detected abnormality. The above "number of times of transmission" indicates the number of times of this transmission. Here, when the relevant abnormality is first detected (and no abnormality detection information that indicates the relevant abnormality has not yet been received), the number of times of transmission is set to 1.

In the present embodiment, it is preferable that the abnormality detection information includes at least the information that indicates the type of abnormality and the longitude and latitude of the abnormality occurrence point (among the above-described information items) which are associated with the information that indicates the number of times of transmission.

Here, the communication unit 12 may obtain the abnormality occurrence point, the time when the abnormality was detected, and the position and time at which the abnormality detection information was received based on a signal output from a radio wave receiver utilizing a GPS (Global Positioning System), which was provided inside or outside the communication unit 12. In another example, the communication unit 12 obtains the relevant position (i.e., coordinates) and time from a base station as a communication partner of the communication unit 12. Furthermore, the communication unit 12 may autonomously compute information which indicates the relevant position by combining a signal received from the GPS and a signal output from a gyro sensor, a velocity sensor, an acceleration sensor, or the like, The communication unit 12 also includes a determination unit 121. The determination unit 121 determines identity between an abnormality indicated by the abnormality detection information received from another radio station or another mobile communication apparatus 1 and an abnormality detected by the abnormality detecting unit 11 of the own mobile communication apparatus 1. Based on the result of the determination, the determination unit 121 determines the necessity of transmission (by the communication unit 12) of the abnormality detection information. In this process, the determination unit 121 determines the necessity, in accordance with a positional relationship between the abnormality occurrence point and the own place.

In the present embodiment, when it is determined that the abnormality indicated by the received abnormality detection information coincides with the abnormality detected by the abnormality detecting unit 11, the following determination is performed. That is, if the distance between the relevant abnormality and the present vehicle is less than a predetermined value at the time when the abnormality indicated by the received abnormality detection information is detected (by a preceding vehicle or the like), then it is determined that the communication unit 12 does not need to transmit the abnormality detection information detected by the abnormality detecting unit 11 of the own mobile communication apparatus 1. That is, Although the abnormality detecting unit 11 of the own mobile communication apparatus 1 has detected an abnormality, the preceding vehicle already transmitted the abnormality detection information which indicates the same abnormality, and thus it is determined that abnormality detection information which indicates the detected abnormality is not to be transmitted.

Even when it is determined that the abnormality indicated by the received abnormality detection information coincides with the abnormality detected by the abnormality detecting unit 11, if the distance between the relevant abnormality and the present vehicle is greater than or equal to the predetermined value at the time when the abnormality indicated by the received abnormality detection information is detected, then the determination unit 121 determines that it is necessary to transmit the abnormality detection information detected by the abnormality detecting unit 11 of the own mobile communication apparatus 1 to another radio station.

That is, if the distance between the abnormality occurrence point and the position of the present vehicle at the time when the abnormality detection information which indicates the relevant abnormality is received is greater than or equal to a predetermined value, then the determination unit 121 can determine that the relevant transmission is necessary although both the abnormalities are the same.

Accordingly, if the position of the mobile communication apparatus 1 of a following vehicle which has received the abnormality detection information from another mobile communication apparatus 1 built in a preceding vehicle is distant from the abnormality occurrence point by a predetermined threshold or greater, then the abnormality detection information can be transmitted as follows.

When the mobile communication apparatus 1, which has received the abnormality detection information at a distance of a predetermined threshold or more, reaches the relevant abnormality point, abnormality detection information about the same abnormality can be transmitted. Therefore, the abnormality detection information can be repeatedly transmitted at specific intervals, by which it is possible to prevent effective notification from being excessively limited.

The necessary/unnecessary determination by the operation content determination unit 121 based on the positional relationship between the abnormality occurrence point and the own position can be performed by employing a parameter which is a distance computed based on, for example, coordinate information which is obtained by utilizing GPS or the like. The operation content determination unit 121 may also perform the necessary/unnecessary determination based on the positional relationship between the abnormality occurrence point and the own position, by employing any of the following parameters.

The determination unit 121 can perform the necessary/unnecessary determination for the abnormality detection information transmission, on assumption that the positional relationship between the abnormality occurrence point and the own position is represented by the number of hops in multi-hop radio communication at the time when the own mobile communication apparatus 1 receives the abnormality detection information from another mobile communication apparatus 1. Here, the multi-hop radio communication is a communication method to cascade-connect a large number of radio stations or other mobile communication apparatuses 1 so as to transmit information in sequence, that is, in a bucket brigade or relay manner. Additionally, the number of hops denotes the number of other intervening radio stations or mobile communication apparatuses 1.

In another example, the determination unit 121 can perform the necessary/unnecessary determination for the abnormality detection information transmission, on assumption that the positional relationship between the abnormality occurrence point and the own position is represented by time difference between the abnormality detection time of another mobile communication apparatus 1 and the own abnormality detection time, that is, abnormality detection time difference. In this case, if the individual mobile communication apparatuses 1 move at an approximately constant speed, the abnormality detection time difference represents a specific distance.

In addition, the determination unit 121 can increase or decrease the number of times of transmission based on the number of times for the determination result to indicate that both the abnormalities are the same. More specifically, if an abnormality that coincides with the abnormality indicated by the received abnormality detection information is detected, it is possible to associate abnormality detection information that indicates the detected abnormality with information that indicates the number of times of transmission. Here, whether or not the number of times of transmission is associated and transmitted with the abnormality detection information can be voluntarily set at the determination unit 121.

If the determination unit 121 determines that the abnormality detection information transmission is necessary, the communication unit 12 transmits abnormality detection information that indicates the abnormality detected by the abnormality detecting unit 11. Here, even when the abnormality indicated by the received abnormality detection information coincides with the abnormality detected by the abnormality detecting unit 11, the determination unit 121 determines that it is necessary to transmit the abnormality detection information if, for example, the distance between the abnormality occurrence point and the own position is greater than or equal to a threshold. That is, even though the abnormalities are the same, the communication unit 12 may transmit the same abnormality detection information again depending on a result of determination based on distance information.

In such a case, the retransmitted abnormality detection information includes the same content as that included in the previously-transmitted information. In this case, if information for the detection time is not included in the abnormality detection information, it may become unclear that the retransmission determination should be performed based on which of the received abnormality detection information items having the same content. In other words, it may be unclear whether or not transmission of duplicated information of the received abnormality detection information to another mobile communication apparatus 1 is necessary.

In contrast, when the determination unit 121 adds information about the number of times of transmission to the abnormality detection information, the transmission order of the abnormality detection information items having the same content can be identified.

The above transmission order corresponds to the order of time when the same determination result was obtained between a plurality of the mobile communication apparatuses 1. When the determination unit 121 has received the abnormality detection information having the same content several times, the determination unit 121 determines that the abnormality detection information, which has the same number of times of transmission as that of the previously-received abnormality detection information or indicates that this is old information, does not need to be transmitted to another mobile communication apparatus 1. Accordingly, duplicate transmission of unnecessary information is prevented.

The number of times of transmission may be defined in ascending or descending order (that is, it may increase or decrease). In addition, the function of the number of times of transmission will be explained later with reference to FIGS. 5A to 5C.

Below, with reference to FIG. 2, an example configuration of an inter-vehicle communication system that employs a plurality of the mobile communication apparatuses 1 shown in FIG. 1.

Figure 2:
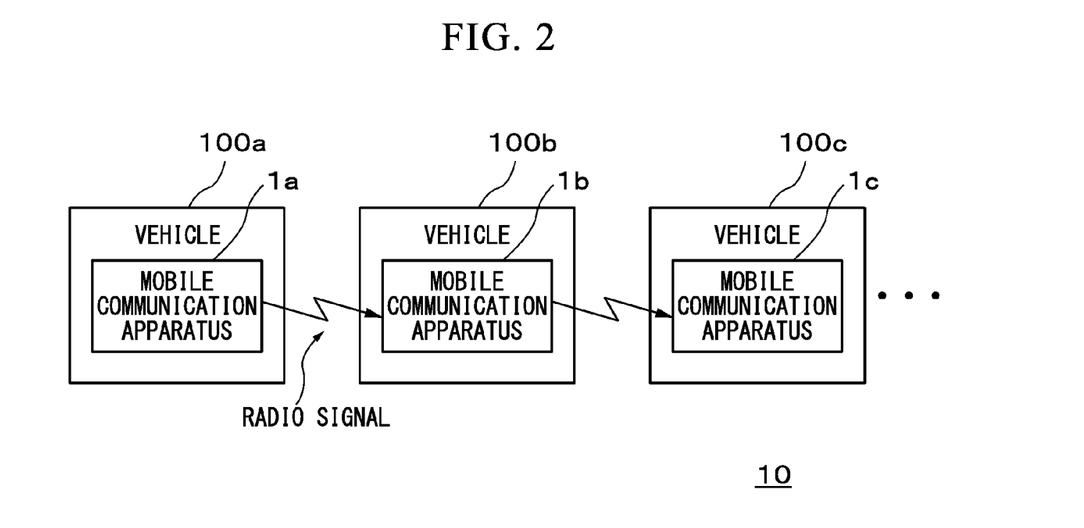
FIG. 2 is a block diagram showing an example configuration of an inter-vehicle communication system that employs a mobile communication apparatus 1 shown in FIG. 1.

An inter-vehicle communication system 10 shown in FIG. 2 consists of vehicles 100a, 100b, 100c, . . . each of which has the mobile communication apparatus 1.

Although the mobile communication apparatuses 1a, 1b, 1c, . . . respectively built in the vehicles 100a, 100b, 100c, . . . have the same structure basically, different terminal IDs (identification signs) are assigned to the individual mobile communication apparatuses. The mobile communication apparatuses 1a, 1b, 1c, . . . may communicate with each other by means of radio multi-hop communication in accordance with a predetermined specification for the inter-vehicle communication system.

Figure 3:
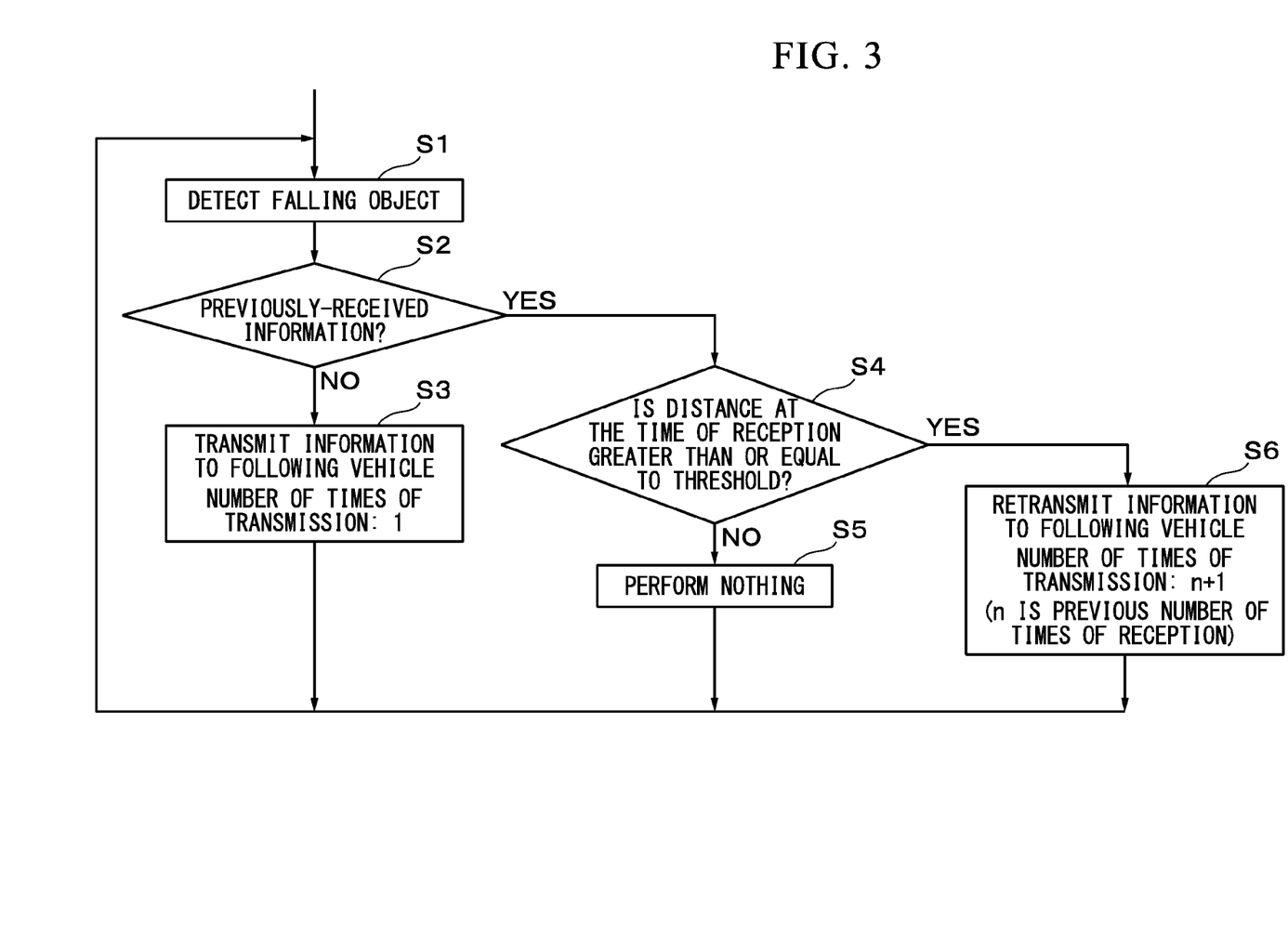
FIG. 3 is a flowchart utilized to explain an example of operation of the mobile communication apparatus 1 shown in FIG. 1.
Figure 4:
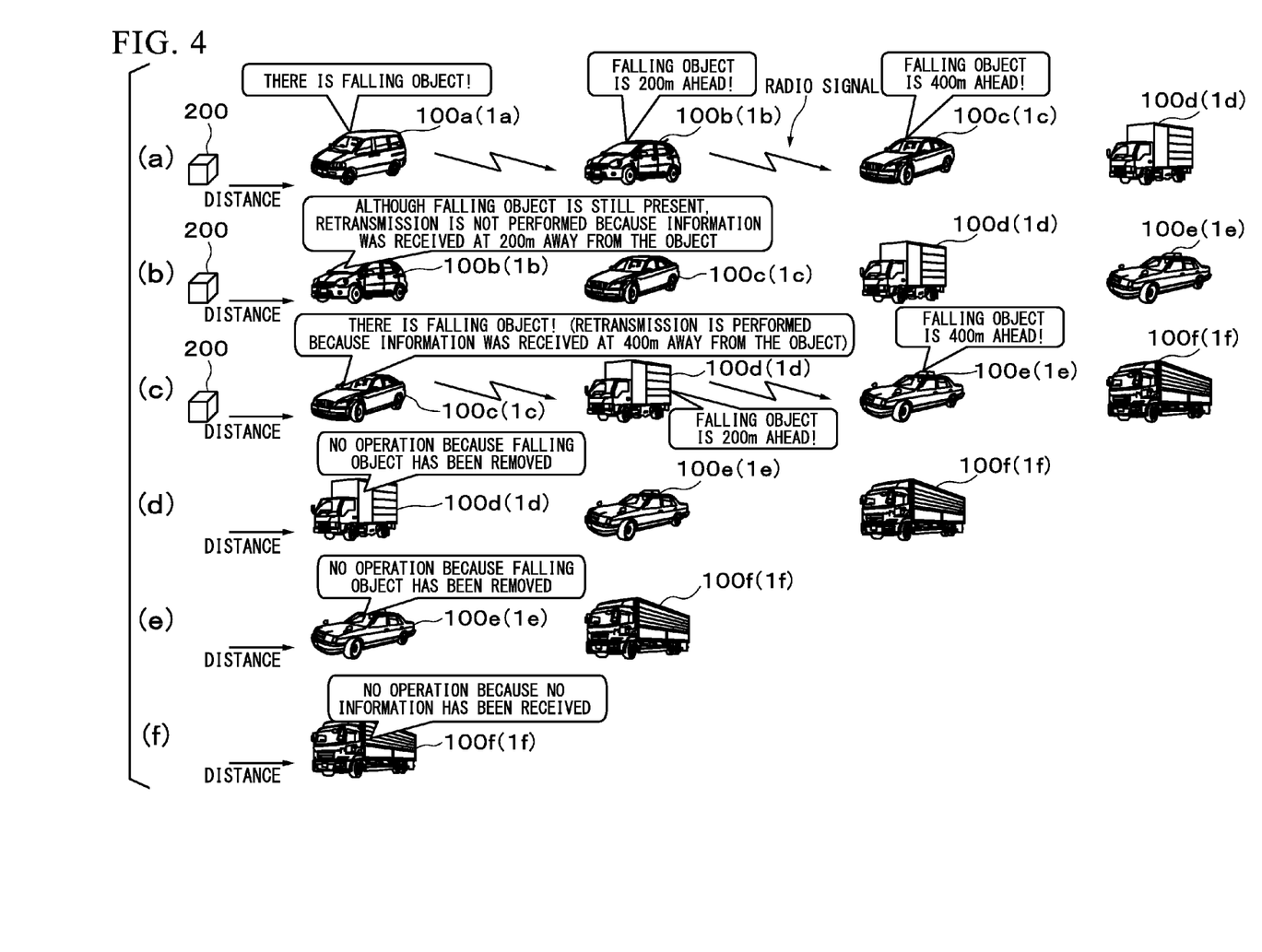
FIG. 4 is a diagram utilized to explain the example of the operation of the mobile communication apparatus 1 shown in FIG. 1.

Next, with reference to FIGS. 3 and 4, an example of operation of the inter-vehicle communication system 10 that utilizes the mobile communication apparatuses as shown in FIGS. 1 and 2. FIG. 3 is a flowchart utilized to explain an example of operation of the mobile communication apparatus 1 shown in FIG. 1. FIG. 4 is a diagram utilized to explain the example of the operation of the mobile communication apparatus 1 shown in FIG. 1.

In FIG. 4, parts indicated by (a) to (f) for the time line represent the state of a falling object 200 and the positional relationship between this object and the vehicles 100a to 100f.

As shown in FIG. 2, the vehicles 100a to 100f have the individual mobile communication apparatuses 1a to 1f. The vehicles 100a to 100f each receive abnormality detection information by means of the radio multi-hop communication utilizing the mobile communication apparatuses 1a to 1f (specifically, the communication unit 12) of the own vehicles, from any of the mobile communication apparatuses 1a to 1f of the other vehicles.

In addition, the vehicles 100a to 100f each duplicate the abnormality detection information received by the mobile communication apparatuses 1a to 1f (specifically, the communication unit 12) of the own vehicles so as to transmit the duplicated abnormality detection information to the mobile communication apparatus 1 of another vehicle by means of the radio multi-hop communication.

In the shown example, the communicable range between the vehicles 100a to 100f by means of the radio multi-hop communication is approximately 200 m.

For example, in part (a) of FIG. 4, the vehicle 100a is closest to the falling object 200, and vehicles 100b to 100d (which follow the vehicle 100a) are driving in the same direction at specific intervals.

More specifically, the vehicles 100a and 100b are driving with an interval of approximately 200 m, and the vehicles 100b and 100c are also driving with an interval of approximately 200 m In addition, a radio signal transmitted from the mobile communication apparatus 1a of the vehicle 1a is received by the mobile communication apparatus 1b of the vehicle 100b. Similarly, a radio signal transmitted from the mobile communication apparatus 1b of the vehicle 1b is received by the mobile communication apparatus 1c of the vehicle 100c.

On the other hand, since the distance between the vehicle 100c and the vehicle 100d is greater than the possible distance (200 m in the present embodiment) for the radio multi-hop communication, a radio signal transmitted from the mobile communication apparatus 1c of the vehicle 100c is not received by the mobile communication apparatus 1d of the vehicle 100d.

Additionally, part (b) of FIG. 4 shows a state after a few minutes passed from the state shown in part (a) of FIG. 4. In part (b), the mobile communication apparatus 1a of the vehicle 100a has already passed the position of the falling object 200 while the vehicle 100b is closest to the falling object 200, where the vehicles 100c to 100e (which follow the vehicle 100b) are driving in the same direction at specific intervals.

Below, the operations of the individual mobile communication apparatuses 1a to 1f built in the vehicles 100a to 100f shown in FIG. 4 when the vehicles 100a to 100f each pass the position of the falling object 200 (i.e., abnormality occurrence point) will be explained with reference to FIG. 3. Each operation of the mobile communication apparatuses 1a to 1f starts when the relevant abnormality detecting unit 11 detects a falling object (see step S1). While the abnormality detecting unit 11 detects no falling object, a standby state is continued or a detecting process is repeatedly performed by the abnormality detecting unit 11 in step S1.

Here, it is assumed as shown in part (a) of FIG. 4 that the abnormality detecting unit 11a of the vehicle 100a detects a falling object 200 (see step S1).

In this case, the determination unit 121 in the abnormality detecting unit 11a of the vehicle 100a executes a determination process in step S2. Specifically, the determination unit 121 in the abnormality detecting unit 11a of the vehicle 100a determines whether or not the falling object 200 detected (or found) by the own abnormality detecting unit 11 coincides with an abnormality indicated by the abnormality detection information which has previously been received from another vehicle.

Such determination whether or not the abnormality detected by the own abnormality detecting unit 11 coincides with the abnormality detected by another vehicle can be performed based on whether or not the type and position of the abnormality detected by the own abnormality detecting unit 11 coincide with the type and position of the abnormality included in the received abnormality detection information. For the position of the abnormality (here, the position of the obstacle 200 as the abnormality occurrence point), coincidence is determined based in consideration of an error pertaining to the position detecting device (e.g., an apparatus which utilizes GPS).

In the present example, it is assumed that the vehicle 100a first detects the falling object 200.

That is, the mobile communication apparatus 1a of the vehicle 100a has received no abnormality detection information that indicates the same abnormality as that detected by the own abnormality detecting unit 11. In this case, the determination unit 121 of the mobile communication apparatus 1a determines that no abnormality identical to an abnormality indicated by previously-received abnormality detection information is detected by the own abnormality detecting unit 11 (i.e., "NO" in step S2).

Next, the communication unit 12 in the mobile communication apparatus 1a of the vehicle 100a transmits abnormality detection information that indicates the falling object 200 according to the result of the determination by the determination unit 121 (see step S3). In this case, the abnormality detection information includes type information which indicates that the abnormality is the falling object 200, position information that indicates the position at which the abnormality was detected (i.e., abnormality occurrence point), and the number of times of transmission.

That is, the abnormality detection information that includes information (about "falling object") as the type of the abnormality and information about the longitude and latitude as the position information is associated with information that indicates the number "1" of times of transmission. The associated information items are transmitted from the mobile communication apparatus 1a of the vehicle 100a and then received by the mobile communication apparatus 1b of the vehicle 100b.

The mobile communication apparatus 1b of the vehicle 100b transmits (i.e., transfers) abnormality detection information, that indicates an abnormality of the identical content, to the mobile communication apparatus 1c of the vehicle 100c.

In the present embodiment, the mobile communication apparatuses 1b and 1c of the vehicles 100b and 100c each compute, based on the position of the falling object 200 (abnormality occurrence point) and the position of the own vehicle at the time when the abnormality detection information is received, the distance between the position of the falling object 200 (i.e., abnormality occurrence point) and the position of the own vehicle and store the computed distance in a predetermined storage device.

In the present example, as shown in part (a) of FIG. 4, when the mobile communication apparatus 1b of the vehicle 100b receives the abnormality detection information from the vehicle 100a, the mobile communication apparatus 1b is located away from the position of the falling object 200 (i.e., abnormality occurrence point) by 200 m. In addition, when the mobile communication apparatus 1c of the vehicle 100c receives the abnormality detection information from the mobile communication apparatus 1b, the mobile communication apparatus 1c is located away from the position of the falling object 200 (i.e., abnormality occurrence point) by 400 m.

Next, a state appearing after an elapse of a few seconds from the state shown in part (a) of FIG. 4 will be explained with reference to part (b) of FIG. 4. As shown in part (b) FIG. 4, when the vehicle 100b comes close to the relevant abnormality, the abnormality detecting unit 11 of the mobile communication apparatus 1b of the vehicle 100b detects the falling object 200 (see step S1). Then the determination unit 121 in the abnormality detecting unit 11b of the vehicle 100b executes the determination process in step S2.

Specifically, the determination unit 121 in the abnormality detecting unit 11b of the vehicle 100b determines whether or not the falling object 200 detected by the own vehicle coincides with an abnormality indicated by the abnormality detection information which has previously been received from another vehicle. In the present example, the abnormality detection information received by the abnormality detecting unit 11b of the vehicle 100b from the abnormality detecting unit 11a of the vehicle 100a is information which indicates that the identical falling object 200 is detected.

Accordingly, the determination unit 121 of the mobile communication apparatus 1b determines that the abnormality detected by the own abnormality detecting unit 11 coincides with the abnormality indicated by the previously-received abnormality detection information (i.e., "YES" in step S2).

Next, the determination unit 121 in the mobile communication apparatus 1b of the vehicle 100b determines whether or not the distance between the falling object 200 and the own vehicle at the time when the abnormality detection information that indicates the identical abnormality was received, is greater than or equal to a threshold (see step S4).

In other words, the determination unit 121 in the mobile communication apparatus 1b of the vehicle 100b determines whether or not the distance between the falling object 200 and the vehicle 100b at the time when the falling object 200 was detected by the abnormality detecting unit 11 of the mobile communication apparatus 1a of the vehicle 100a, is greater than or equal to the threshold.

For step S4, if the abnormality detection information for the identical content has been received several times from a preceding vehicle, the determination unit 121 of the mobile communication apparatus 1b compares with the predetermined threshold, the distance between the falling object 200 and the own vehicle at the time when the abnormality detection information having the largest number of times of transmission (i.e., the latest information) among the plurality of the abnormality detection information items was received.

In the present case, the mobile communication apparatus 1b of the vehicle 100b has received the abnormality detection information (whose "number of times of transmission" is 1) only once, that is, has never received the abnormality detection information (that indicates the falling object 200) whose number of times of transmission is 2 or more.

In addition, the distance utilized in step S4 from the abnormality occurrence point (indicated by the received abnormality detection information) to the own position at which the relevant abnormality is detected may be set based on the number of hops for radio multi-hop communication, to approximately 80% of a distance within which the radio multi-hop communication can be performed. More specifically, if the number of hops (i.e., the number of radio stations for relay operation) for the radio multi-hop communication is 1 and the reach distance utilizing 1 (hop) is approximately 400 m, the threshold can be set to approximately 350 m. Below, it is assumed that the threshold for the distance is 350 m.

In the present example, the distance between the falling object 200 and the own vehicle when the mobile communication apparatus 1b of the vehicle 100b receives the abnormality detection information from the mobile communication apparatus 1a of the vehicle 100a is 200 m. Therefore, the result of the determination for step S4 performed by the determination unit 121 of the mobile communication apparatus 1b is "NO". Accordingly, the communication unit 12 of the mobile communication apparatus 1b performs no retransmission (transfer) of the abnormality detection information that indicates the abnormality detected by the own abnormality detecting unit 11 (see step S5).

Next, as shown in part (c) FIG. 4, when the vehicle 100c comes close to the relevant abnormality, it is assumed that the abnormality detecting unit 11 of the mobile communication apparatus 1c of the vehicle 100b detects the falling object 200 (see step S1). Then the determination unit 121 in the abnormality detecting unit 11c of the vehicle 100c executes the determination process in step S2.

Specifically, the determination unit 121 in the abnormality detecting unit 11c of the vehicle 100c determines whether or not the detected falling object 200 coincides with an abnormality indicated by the abnormality detection information which has previously been received from another vehicle. In the present example, the abnormality detection information received by the abnormality detecting unit 11c of the vehicle 100c from the abnormality detecting unit 11b of the vehicle 100b is information about the falling object 200 for which the number of times of transmission is 1. Accordingly, the determination unit 121 of the mobile communication apparatus 1c determines that the detected abnormality coincides with the abnormality indicated by the previously-received abnormality detection information (i.e., "YES" in step S2).

Next, the determination unit 121 in the mobile communication apparatus 1c of the vehicle 100c determines whether or not the distance between the position of the detected abnormality (i.e., abnormality occurrence point) and the own vehicle at the time when the abnormality indicated by the received abnormality detection information was detected, is greater than or equal to the threshold (see step S4). In the present example, the distance between the falling object 200 and the own vehicle (specifically, the mobile communication apparatus 1c) when the mobile communication apparatus 1c of the vehicle 100c receives the abnormality detection information from the mobile communication apparatus 1b of the vehicle 100b is 400 m (see part (a) of FIG. 4). Since the threshold of the present embodiment is 350 m, the result of the determination for step S4 by the determination unit 121 of the mobile communication apparatus 1c is "YES", and the communication unit 12 retransmits the abnormality detection information (see step S6).

In this process, the communication unit 12 of the mobile communication apparatus 1c increases the number of times of transmission for the abnormality detection information to be retransmitted by 1, that is, sets the relevant number to 2. That is, the abnormality detection information that includes information such as "falling object" as the type of the abnormality and information about the longitude and latitude as the position information is associated with the number "2" of times of transmission. The associated information items are transmitted from the mobile communication apparatus 1c of the vehicle 100c and then received by the mobile communication apparatus 1d of the vehicle 100d.

Then the mobile communication apparatus 1d of the vehicle 100d transmits abnormality detection information, that has the same content as that of the received information, to the mobile communication apparatus 1e of the vehicle 100e.

The mobile communication apparatuses 1d and 1e of the vehicles 100d and 100e each compute the distance between the position of the falling object 200 (i.e., abnormality occurrence point) and the position of the own vehicle at the time when the information transmitted from the mobile communication apparatus 1c is received and store the computed distance in a predetermined storage device.

In the present example, as shown in part (c) of FIG. 4, when the mobile communication apparatus 1d of the vehicle 100d receives the abnormality detection information from the mobile communication apparatus 1c of the vehicle 100c, the mobile communication apparatus 1d is located away from the position of the falling object 200 (i.e., abnormality occurrence point) by 200 m. In addition, when the mobile communication apparatus 1e of the vehicle 100e receives the abnormality detection information from the mobile communication apparatus 1d of the vehicle 100d, the mobile communication apparatus 1c is located away from the position of the falling object 200 (i.e., abnormality occurrence point) by 400 m.

Accordingly, the information terminal apparatus 1d stores in the own storage device, information which indicates that the distance from the falling object 200 is 200 m. Similarly, the information terminal apparatus 1e stores in the own storage device, information which indicates that the distance from the falling object 200 is 400 m.

Next, as shown in part (d) of FIG. 4, it is assumed that when the vehicle 100d passes the position of the falling object 200, the falling object 200 has already been removed.

In this case, as shown in parts (d), (e), and (f) of FIG. 4, when the vehicles 100d, 100e, and 100f each pass the position at which the falling object 200 was present (i.e., abnormality occurrence point), no abnormality is detected by each of the mobile communication apparatuses 1d, 1e, and 1f. Therefore, the processes starting from step S2 are not executed, and no abnormality detection information is transmitted from mobile communication apparatuses 1d, 1e, and 1f of the vehicles 100d, 100e, and 100f.

Figure 5A:
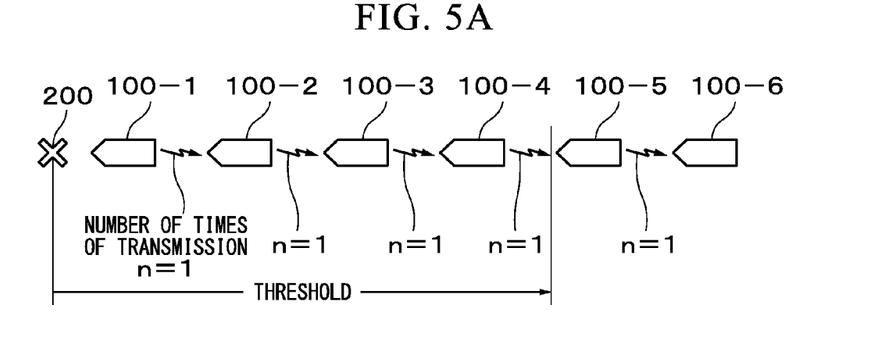
FIG. 5A is a diagram utilized to explain another example of the operation of the mobile communication apparatus 1 shown in FIG. 1.
Figure 5B:
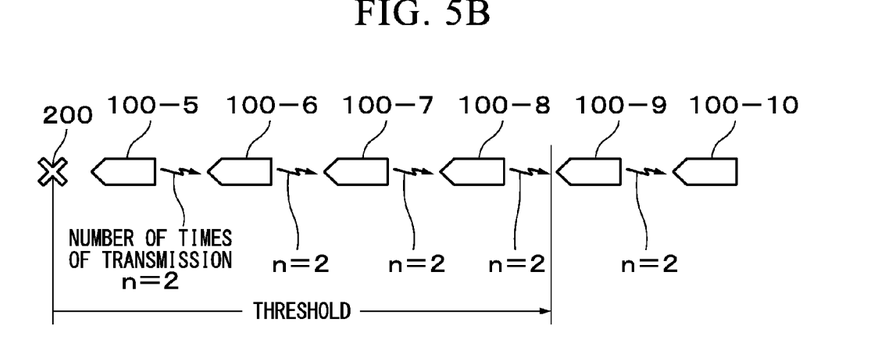
FIG. 5B is also a diagram utilized to explain the example of the operation.
Figure 5C:
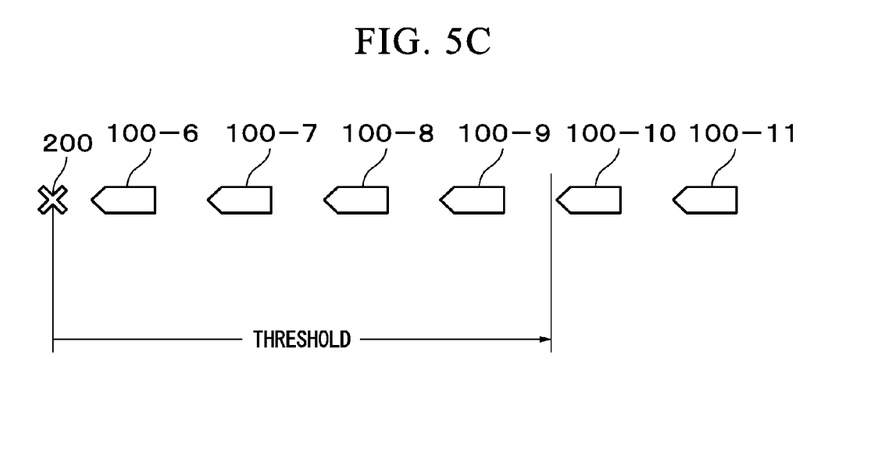
FIG. 5C is also a diagram utilized to explain the example of the operation.

Next, an effect of the present embodiment obtained when the number of times of transmission is appended to the abnormality detection information will be explained with reference to FIGS. 5A to 5C. FIGS. 5A to 5C are schematic plan views that indicate the falling object 200, the threshold utilized to determine the necessity of the transmission of the abnormality detection information that indicates the abnormality detected by the own abnormality detecting unit, and the position relationship between a plurality of vehicles 100-1 to 100-11.

Although the threshold here is explained as distance, any manner may be employed if the threshold represents a positional relationship between the falling object 200 and the own vehicle by utilizing the number of hops or time, as described above.

The vehicles 100-1 to 100-11 each include the mobile communication apparatus 1. FIG. 5A represents a state in which the vehicle 100-1 comes close to the falling object 200, and the abnormality detecting unit 11 of the mobile communication apparatus 1 in the vehicle 100-1 detects the falling object 200. FIG. 5B represents a state appearing after an elapse of a few seconds from the state shown in FIG. 5A, where the vehicle 100-5 comes close to the falling object 200, and the abnormality detecting unit 11 of the mobile communication apparatus 1 in the vehicle 100-5 detects the falling object 200. FIG. 5C represents a state appearing after an elapse of a few seconds from the state shown in FIG. 5B, where the vehicle 100-6 comes close to the falling object 200, and the abnormality detecting unit 11 of the mobile communication apparatus 1 in the vehicle 100-6 detects the falling object 200.

In the example shown in FIG. 5A, abnormality detection information, with which information that indicates that the number of times of transmission is 1 is associated, is transmitted from the mobile communication apparatus 1 of the vehicle 100-1. Then the identical information is transmitted by means of the radio multi-hop communication to the mobile communication apparatuses 1 of the vehicles 100-2 to 100-6 sequentially.

In addition, for the vehicles 100-5 and 100-6, the distance between the falling object 200 and the own vehicle at the time when the abnormality detection information transmitted from the mobile communication apparatus 1 of the vehicle 100-1 is received is greater than or equal to the predetermined threshold.

Furthermore, in a storage device of each mobile communication apparatus 1 of the vehicles 100-2 to 100-6, the following information items are stored: (i) information in which the abnormality detection information that indicates the falling object 200 is associated with information which indicates that the number of times of transmission is 1 and (ii) a result of computation of each distance from the position of the falling object 200 (i.e., abnormality occurrence point) to the own vehicle.

In the example shown in FIG. 5B, when the abnormality detecting unit 11 of cellular phone terminal 1 in the vehicle 100-5 detects the falling object 200, the determination results of steps S2 and S4 are each "YES". Therefore, abnormality detection information, which indicates that the number of times of transmission is 2, is transmitted to a following vehicle from the mobile communication apparatus 1 of the vehicle 100-5 (see step S6 in FIG. 3). Then the mobile communication apparatuses 1 of the vehicles 100-6 to 100-10 transmits the identical information sequentially, by means of the radio multi-hop communication.

For example, in the storage device of the mobile communication apparatus 1 of the vehicle 100-6, the following information items are stored: (i) information in which the abnormality detection information that indicates the falling object 200 is associated with information which indicates that the number of times of transmission is 2 and (ii) a result of computation of the distance from the position of the falling object 200 (i.e., abnormality occurrence point) to the own vehicle (in this case, the distance is less than the threshold).

In the example shown in FIG. 5C, when the abnormality detecting unit 11 of cellular phone terminal 1 in the vehicle 100-6 detects the falling object 200, the determination result of step S2 is "YES" while the determination result of step S4 is "NO". The operation in this case will be specifically explained.

As shown in FIG. 5A, the storage device of the mobile communication apparatus 1 of the vehicle 100-6 stores the abnormality detection information that indicates the falling object 200, with which the information, which indicates that the number of times of transmission is 1, is associated. In addition, as shown in FIG. 5B, this storage device also stores the abnormality detection information that indicates the falling object 200, with which the information, which indicates that the number of times of transmission is 2, is associated.

Therefore, the determination unit 121 of the mobile communication apparatus 1 of the vehicle 100-6 determines whether or not the distance between the position of the falling object 200 (i.e., abnormality occurrence point) and the vehicle 100-6 at the time when the abnormality detection information (with which the information which indicates that the number of times of transmission is 2 is associated) was received is greater than or equal to the threshold.

In this case, as explained above with reference to FIG. 5B, the relevant distance between the position of the falling object 200 (i.e., abnormality occurrence point) and the vehicle 100-6 is less than the threshold. Therefore, the determination unit 121 determines that no abnormality detection information that indicates the abnormality detected by the abnormality detecting unit 11 is not to be transmitted. Accordingly, no abnormality detection information that indicates the falling object 200 is not transmitted from the mobile communication apparatus 1 of the vehicle 100-6.

Therefore, as shown in FIG. 5A, even when a plurality of vehicles (in the present example, vehicles 100-5 and 100-6) are present at positions by which the distance between the falling object 200 and the own vehicle exceeds the threshold, it is possible to prevent frequent retransmission of the identical abnormality detection information.

Accordingly, even when a following vehicle detects the identical falling object 200, it is possible to prevent a situation in which the abnormality detection information is transmitted from the mobile communication apparatus 1 (as a "parent") built in the relevant vehicle to following vehicles (as "children") sequentially by means of the radio multi-hop communication. Therefore, the communication traffic for the inter-vehicle communication can be decreased.

As described above, the present embodiment has a function of communicating information to a following vehicle by means of the radio multi-hop communication that utilizes the inter-vehicle communication and also has a function of detecting a falling object or another abnormality on a road by using a camera built in the own vehicle, or the like. The vehicle which has detected the abnormality communicates detection information to a following vehicle by means of the radio multi-hop communication that utilizes the inter-vehicle communication.

In this process, the mobile communication apparatus 1 of a following vehicle confirms whether or not information that indicates the identical abnormality was previously obtained when the preceding vehicle detected the abnormality. If such information was previously received, the relevant mobile communication apparatus 1 does not function as a parent for the radio multi-hop communication, that is, does not transmit information to a following vehicle.

Here, the distance or position at which the own vehicle received the information is stored, and if the distance between the position of the own vehicle and the abnormality occurrence point is greater than or equal to a fixed value, the following operation is performed. That is, if the abnormality remains when the own vehicle passes the abnormality occurrence point, the relevant information is retransmitted. This is performed so as to prevent a situation in which a following vehicle, that received no abnormality detection information via the radio multi-hop communication when a preceding vehicle detected an abnormality, cannot recognize the same abnormality until the own vehicle detects the abnormality.

That is, if the distance from the abnormality occurrence point to the own vehicle at the time of receiving the abnormality detection information exceeds a specific threshold, abnormality detection information that indicates the detected abnormality is transmitted (or transferred) so that the information can also be communicated to each vehicle which could not obtain the abnormality detection information transmitted by the mobile communication apparatus 1 of a preceding vehicle prior to the detection of the own vehicle.

When the relevant abnormality is removed, the retransmitting function is cancelled accordingly. Therefore, in accordance with the present embodiment, an information reducing function is provided and it is possible to solve a problem such that the available communication band is tightened if message transmission is preformed every time an abnormality is detected.

Embodiments of the claimed invention are not limited to that explained above, and the following modifications are possible.

For example, the distance determination in step S4 of FIG. 3 can be performed based on the number of hops (i.e., the number of actual radio relay stations when the relevant information is received via multi-hop communication). More specifically, the number of hops denotes the number of mobile communication apparatuses 1 that transfer (i.e., relay), by means of inter-vehicle radio multi-hop communication, information transmitted from a parent mobile communication apparatus 1 (which issues novel information).

In this case, the communication unit 12 of each mobile communication apparatus 1 associates the information (communicated between the individual mobile communication apparatuses 1) with information that indicates the number of hops. When the communication unit 12 receives the relevant abnormality detection information, the number of hops computed when the own communication unit 12 transfers the relevant abnormality detection information via the radio multi-hop communication is stored.

The determination in step S4 of FIG. 3 for the distance between the abnormality occurrence point and the own vehicle may also be performed based on time difference between the abnormality detection time of another vehicle that transmitted relevant information and the abnormality detection time of the own vehicle.

In this case, the communication unit 12 of the mobile communication apparatus 1 transmits information (i.e., to be transmitted between the individual mobile communication apparatuses 1) in which abnormality detection information that indicates an abnormality detected by the abnormality detecting unit 11 is associated with information that indicates the time at which the abnormality is detected. In addition, when the communication unit 12 receives the abnormality detection information via the radio multi-hop communication, information that indicates the reception time is associated with the received information and stored in an own storage device.

A program for executing the functions of individual functional units for the present invention may be stored in a computer readable storage medium, and the program stored in the storage medium may be loaded and executed on a computer system, so as to perform the relevant functions.

Here, the computer system has hardware resources which may include an OS and peripheral devices. The computer system also has a WWW system that provides a homepage service (or viewable) environment.

The above computer readable storage medium is a storage device, for example, a portable medium such as a flexible disk, a magneto optical disk, a ROM, or a CD-ROM, or a memory device such as a hard disk built in a computer system.

The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system.

The transmission medium for transmitting the program has a function of transmitting data, and is, for example, a (communication) network such as the Internet or a communication line such (e.g., a telephone line).

In addition, the program may execute part of the above-explained functions. The program may also be a "differential" program so that the above-described functions can be executed by a combination of the differential program and an existing program which has already been stored in the relevant computer system.

Priority is claimed on Japanese Patent Application No. 2013-017373, filed Jan. 31, 2013, all contents of which are incorporated herein by reference.

INDUSTRIAL APPLICABILITY

In accordance with the present invention, the number of times of transmission of identical information can be reduced, and thereby it is possible to prevent the available communication band from being tightened due to unnecessary communication.

REFERENCE SYMBOLS

1 mobile communication apparatus
10 inter-vehicle communication system
11 abnormality detecting unit
12 communication unit
121 determination unit
100a to 100f, 100-1 to 100-11 vehicle

What is claimed is:
1. A mobile communication apparatus comprising:
an abnormality detecting device configured to detect an abnormality occurring on a route; and
a communication device, further including a determination device, configured to communicate with a preceding apparatus and a subsequent apparatus on the route, wherein the communication device transmits first abnormality detection information indicating the abnormality detected by the abnormality detecting device when the determination device determines to transmit the first abnormality detection information to the subsequent apparatus on the route,
wherein upon receiving second abnormality detection information from the preceding apparatus on the route, the determination device determines whether or not the second abnormality detection information matches the abnormality detected by the abnormality detecting device, and wherein upon determining that the second abnormality detection information matches the abnormality detected by the abnormality detecting device, the determination device determines whether or not to transmit the first abnormality detection information to the subsequent apparatus in accordance with a positional relationship with the preceding apparatus positioned to detect the second abnormality detection information.

2. The mobile communication apparatus in accordance with claim 1, wherein when the determination device determines that the second abnormality detection information matches the abnormality detected by the abnormality detecting device, the determination device determines to transmit the first abnormality detection information to the subsequent apparatus on a condition that a distance with the preceding apparatus positioned to detect the second abnormality detection information is greater than or equal to a predetermined threshold.

3. The mobile communication apparatus in accordance with claim 1, wherein when the determination device determines that the second abnormality detection information matches the abnormality detected by the abnormality detecting device, the determination device determines to transmit the first abnormality detection information to the subsequent apparatus on a condition that the communication device receives the second abnormality detection information via radio multi-hop communication with a number of hops greater than or equal to a predetermined threshold.

4. The mobile communication apparatus in accordance with claim 1, wherein when the determination device determines that the second abnormality detection information matches the abnormality detected by the abnormality detecting device, the determination device determines to transmit the first abnormality detection information to the subsequent apparatus on a condition that an elapsed time from the preceding apparatus detecting the second abnormality detection information to the abnormality detecting device detecting, the abnormality is longer than or equal to a predetermined value.

5. The mobile communication apparatus in accordance with claim 1, wherein the determination device determines that the second abnormality detection information matches the abnormality detected by the abnormality detecting device, the communication device transmits to the subsequent apparatus information indicating a number of times the communication device transmits the abnormality in connection with the first abnormality detection information.

6. A mobile communication method comprising:
   detecting an abnormality occurring on a route as first abnormality detection information;
   upon receiving second abnormality detection information from a preceding apparatus on the route, determining whether or not the second abnormality detection information matches the detected abnormality; and
   upon determining that the second abnormality detection information matches the detected abnormality determining to transmit the first abnormality detection information to a subsequent apparatus on the route in accordance with a positional relationship with the preceding apparatus positioned to detect the second abnormality detection information.

7. A non-transient computer-readable storage medium storing a program causing a computer to implement the mobile communication method according to claim 6.

* * * * *